Nov. 16, 1965   M. HOSSMANN   3,218,629
METHOD AND APPARATUS FOR DIGITAL PROCESSING
OF MEASURING RESULTS
Filed March 27, 1962   4 Sheets-Sheet 1

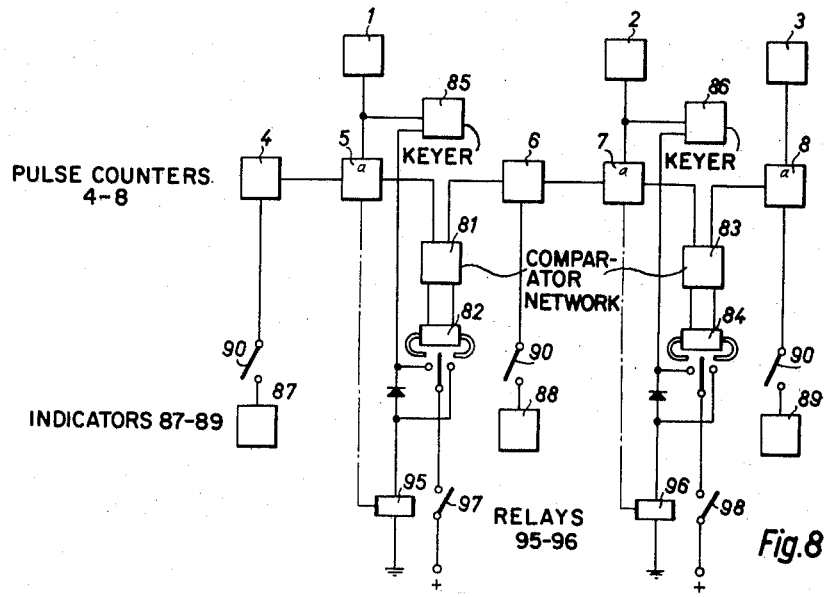
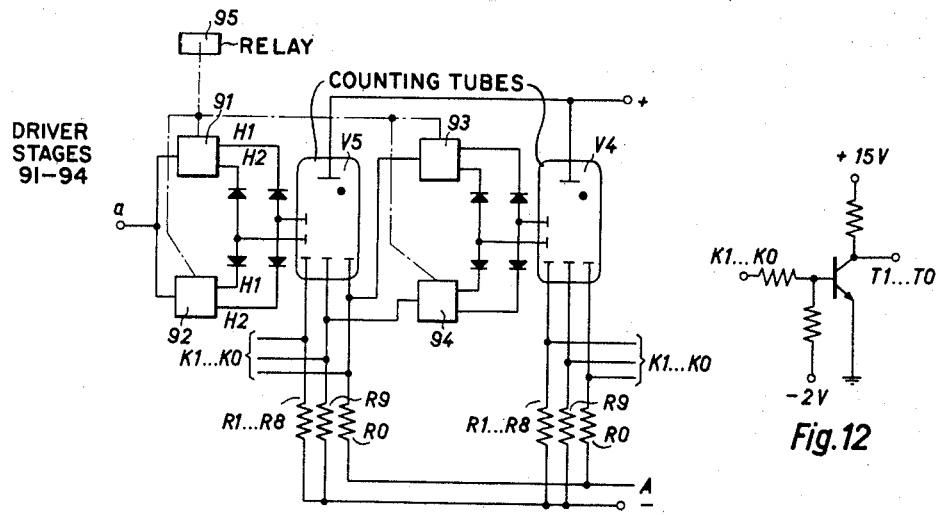
Fig.8
Fig.9
Fig.12

United States Patent Office 3,218,629
Patented Nov. 16, 1965

3,218,629
METHOD AND APPARATUS FOR DIGITAL PROCESSING OF MEASURING RESULTS
Marcel Hossmann, Zurich, Switzerland, assignor to Albiswerk Zurich A.G., Zurich, Switzerland, a corporation of Switzerland
Filed Mar. 27, 1962, Ser. No. 182,840
Claims priority, application Switzerland, Mar. 28, 1961, 3,727/61
9 Claims. (Cl. 340—347)

My invention relates to a method and apparatus for digital encoding, indicating or other processing of measured quantities and other quantitative data. According to the digital principle, the values of the measured quantities are determined digitally from a plurality of partial measurements obtained from respective sensors or signal generators, each forming a portion of the digital values that constitute the total value involved.

Digital measuring and processing of data comprises a simple counting operation and can be employed wherever the measuring magnitude can be quantitized, i.e. subdivided into a number of smaller units. The counting of these units then results in the value of the measuring magnitude.

Among electrical quantities, a frequency, defined as the number of oscillations per unit of time or the number of periods within a time interval, is inherently in the necessary quantum form. Therefore attempts have been made to convert other measurable quantities so that they can be measured with such a quantum magnitude. Thus, a voltage can be measured by comparing it with a saw-tooth voltage having a constant rise time and digitally counting the time interval between the occurrence of the reference potential on the saw-tooth and the time instant that the voltage to be measured equals the saw-tooth voltage.

In lieu of a saw-tooth voltage, one or more synchronous, stairway or step voltages can also be employed for such counting purposes. In this case the number of steps of the individual step voltages should have a ratio relative to each other that corresponds to the ratio prevailing in the chosen number system between the individual digits (i.e. digit positions). For example, the ratio 1:10 would apply if the decimal system of counting is being employed. To each step-voltage generator there is assigned a separate counter which is connected to a gate circuit. These gate circuits are opened by the step generator of the next higher decade, and they are blocked as soon as the step voltage has attained the measured quantity.

"Individual digits," "first digits," "last digits" or "digit positions" refer to the digital order within a digital number, for example the hundreds digit, the tens digit or unit digit in a decadic number.

Similar to the step-voltage comparison method mentioned above, is the zero compensation method. Here the input or measured magnitude is compared with an oppositely poled, accurately known compensating magnitude. As long as there is a difference between the two magnitudes, a compensating quantum magnitude is incrementally added. The decadic indication of the measuring magnitude results in a corresponding decadic graduation of the measuring ranges. In the smallest measuring range the last decade is determined by the smallest measurable quantum. If the indication in the last digit (i.e. digit position) is still to be useful, the indeterminacy or error limit of the analog-digital conversion and of the stray in measuring results should not be greater than $\pm 1$ unit of the last decade, because the indeterminacy or error limit of $\pm 1$ unit fundamentally inherent in the counting means must also be taken into account.

For measuring operations performed according to the step-voltage comparison method or according to the zero compensating method, these two indeterminacies occur in the last digit of each individual partial result. For this reason, the measuring value for each partial measurement is supplied in form of a plural-digit value, whereas in the final result only those value positions are indicated or utilized that are assumed to be reliable. The purpose of proceeding in this manner is that errors of about two units in the last digital position are not indicated. For example, in the decimal system each partial measuring operation is accomplished in form of a two-digit value and only the tens number is indicated. This tens number of course is more accurate than the unit number of the two-digit value. Nevertheless, the unit digit cannot be disregarded because, for example, a partial result could have the value 49, whereas the accurate amount, with an uncertainty of but one unit, would result in the number 50. That is, a small error can affect the next tens position or, when a higher number of digits is involved, may even affect more than one higher digit position.

It is an object of my invention to eliminate this shortcoming of the above-mentioned method and to provide analog-to-digital conversion methods and apparatus of considerably increased accuracy and reliability.

To this end, and in accordance with the invention, the number of digit positions of each of the partial measurements (which partial measurements jointly furnish the full value to be digitally expressed) is such that only the last digit is affected by indeterminacy and this indeterminacy amounts to less than one-half of the number of possible distinct cipher values in this last digit or digital position. (The word "cipher" is used herein to denote "numeral" or "figure" as indicative of the numerical value used in a single digit (i.e. digital position.) The choice of this term is for the purpose of distinction from the use of the word "number which appears in this specification frequently in a different sense, for example applied to the "number" of digits or digital positions.) The cipher value of this last digit is determined a second time in the first digital position of another more precise partial result. Thereafter the last cipher of the first partial measurement is corrected—upwardly or downwardly, whichever correction is smaller—to the first-digit value of the other partial result, this first-digit value having in the ultimate count of the quantity measured the same digital position as the said last digit of the first partial measurement.

The invention eliminates the general requirement that, when employing the step-voltage comparing method, the error range of the analog-digital converter must not be greater than $\pm$ unit. As a result, a converter according to the principles of my invention can be given a considerably simpler design. Furthermore, the synchronous course of the step voltages may possess some tolerance. The highest permissible error limits due to stray of the measuring results caused by the converter as well as of the digital indication effected thereby, may amount up to $\pm 4$ units when employing the decimal system.

Reverting to the mentioned numerical example, assume that the first partial result is in the amount of 49. The second partial measurement comprises the last digit position a second time as a tens digit and again furnishes a two-digit amount. Assume that this amount is 01. The tens position of this second amount, of course, is more accurate than the unit position of the first-mentioned amount. The correction of the partial value 49 by the tens position of the second partial result has the effect of changing the cipher 9 to the cipher 0. By tens transfer from 9 to the first digit position in the first partial result, the ultimate and accurate amount of 501 is obtained.

In order to eliminate or minimize the possibility of error in the last partial measurement, this partial measurement can be repeated and the arithmetic mean value can then be formed. This reduces the indeterminacies inherent in the converter and in the stray of the measuring operation to a minimum so that only the digital indeterminacy of ±1 remains. The formation of the arithmetic mean value can be effected in a simple manner by having in a decimal system the number of measurements correspond to a decimal digit value, whereafter the corresponding digit positions of the sum are cut off. Consequently, when performing the measurement ten times, the unit position of the sum is disregarded and only the other positions are evaluated.

According to another feature of my invention, the partial results are counted into data storers possessing a number if individual memory limits corresponding to the number of digits in the partial measurements; and the memory units in each measurement storer are connected with each other by tens or digit transfer means. I further provide correcting means between the last memory unit of one measurement storer and the first memory unit of that measurement storer which memorizes the same digit position a second time with respect to the total measured quantity, these correcting means acting to eliminate the difference between these two memorized values by changing the value in the first memorizing unit by the other value by means of the smallest possible number of digital steps.

The above-mentioned and more specific objects, advantages and features of my invention, said features being set forth with particularity in the claims annexed hereto, will be apparent from, and will be mentioned in, the following with reference to two embodiments of analog-to-digital converters according to the invention illustrated by way of example in FIGS. 1 to 7 and 8 to 12 respectively of the accompanying drawings. More in detail:

Figure 3:
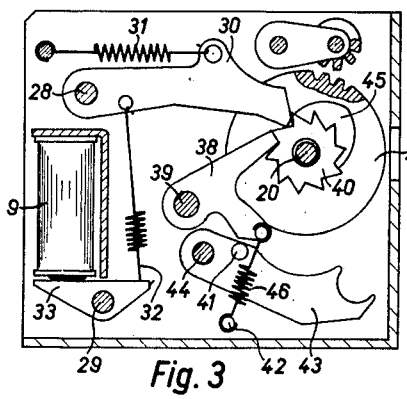
FIG. 3 is a view onto the first number drum, constituting a section taken in a plane of FIG. 2 located between the front wall of the housing and the first number drum.
Figure 5:
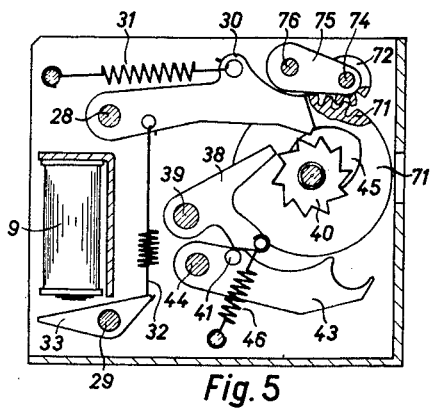

FIG. 5 also shows the same cross section as FIG. 3 but with a switching pawl and detent in inactive position and a tens transfer member in operation.

Figure 2:
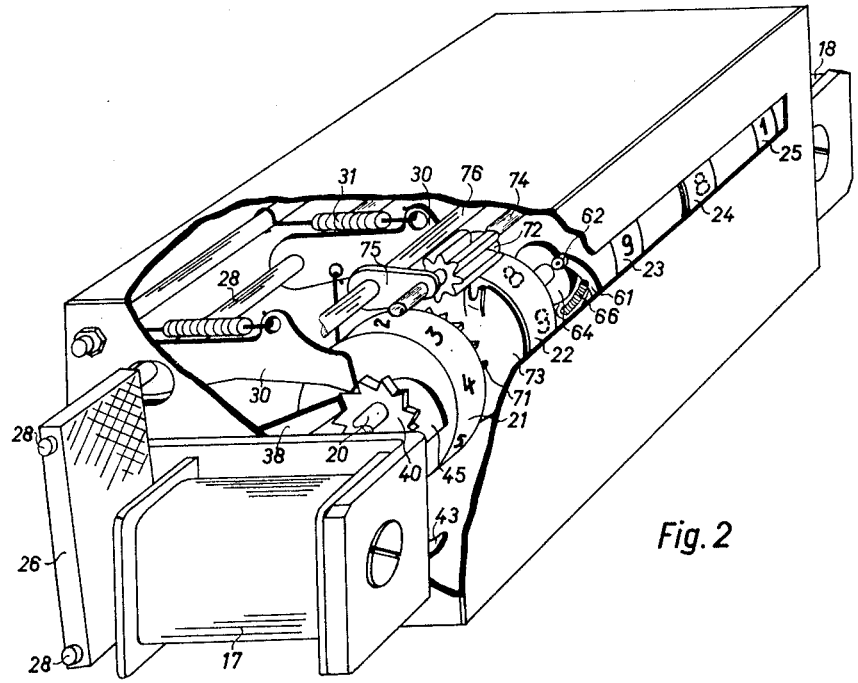
FIG. 2 is a perspective view of the same converter designed as a three-decade counter with five number drums, the housing being shown partly eliminated.
Figure 6:
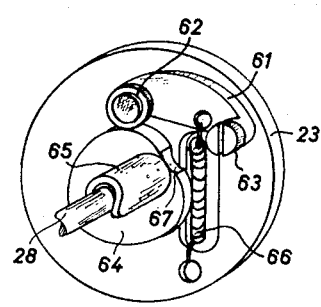

FIG. 6 is a perspective view of correcting means appertaining to the third or fifth number drum in the converter according to FIG. 2.

Figure 7:
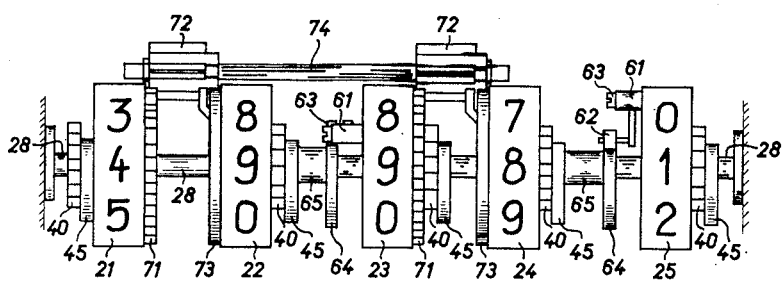

FIG. 7 is a view onto the number drums of FIG. 2 in conjunction with only the correcting means and tens transferrers.

FIG. 8 is a block diagram of a substantially electronic converter according to the invention.

FIG. 9 is the circuit diagram of electronic counter tubes with two-decadic data storing with the aid of decadic counting tubes (circuit diagram of the electronic counter stages).

Figure 10:
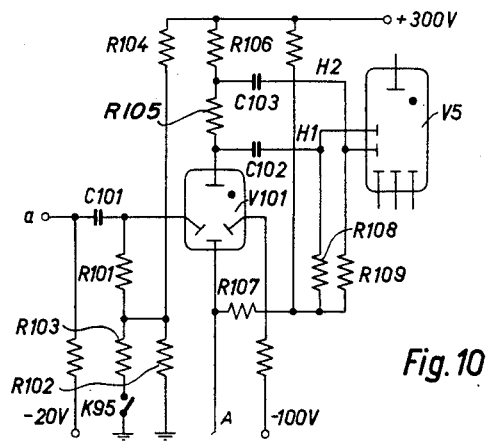

FIG. 10 is the circuit diagram of a driver stage through the counter tubes shown in FIG. 9.

Figure 11:
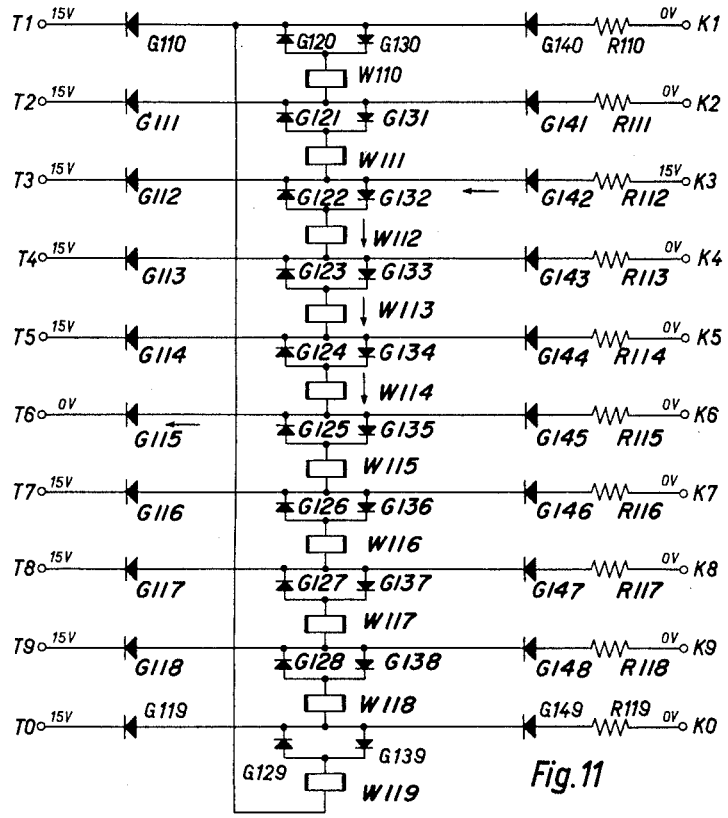

FIG. 11 is the circuit diagram of a reversing stage forming part of the correcting means.

FIG. 12 is the circuit diagram of the electronic correction means.

Figure 1:
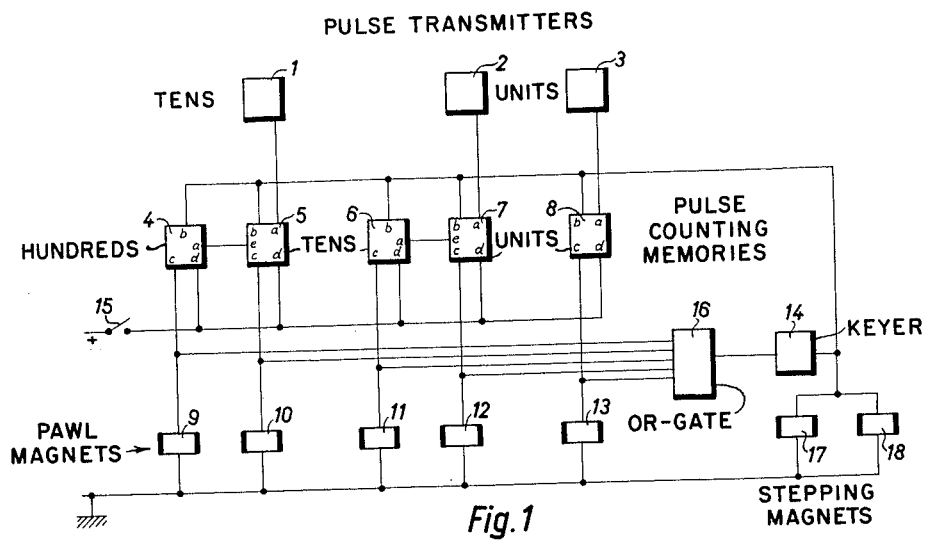
FIG. 1 is a block diagram for the electrical components of a substantially mechanical converter.

The block diagram according to FIG. 1 relates to a known measuring and data-transmitting system whose design and performance for measuring purposes are described in detail in the literature. Such a description is available, for example, in the German-language periodical Elektronik 1960, No. 10, pages 291 to 297.

The sensors or measuring-value transmitters 1, 2 and 3 determine the quantity to be measured or measuring magnitude with the aid of the zero compensation or step-voltage comparing method. The graduation among the partial results issuing from the respective sensors or transmitters is chosen so that each transmitter determines one of the respective digit positions or decades of the ultimate result and issues the measured amounts pulsewise in two-digit form. The embodiment of FIG. 1, presented by way of example, affords determining a three-position measuring result. The sensor or value transmitter 1 responds to the measured quantity or measuring magnitude in tens steps; the sensors 2 and 3 respond in unit steps. The sensor or transmitter 3 is provided with a built-in repetition counter of known design which repeats the measurement a desired number of times, for example ten times. This transmitter then adds the ten measurements but issues only the first digit (the tens digit) of the internally added sum, whereby the arithmetic mean value of the amount is obtained. If desired, the sensor or transmitter 3 may, for example, respond to the measuring magnitude in steps of one-tenth value but only transmit the integral unit steps.

The output of each transmitter 1, 2, 3 is connected to respective decadic counter stages 4, 5 and 6, 7 and 8. These counter stages may be any known form of pulse counters and hence may also be designed as counter tubes according to FIG. 9. The counter stages 4 to 8 are coupled with each other so that the counter stages 4 and 5 form a two-digit result memory and the counter stages 6 and 7 also form together a two-digit memory. The counter stage 4 stores the hundreds values of the three-position measuring result. The counter stages 5 and 6 store the tens values, and the counter stages 7 and 8 the unit values.

The performance of the counting stages is likewise described in the above-mentioned publication. The transmitters 1, 2, 3 issue pulses whose number is proportional to the measuring magnitude. These pulses pass to the input terminals $a$ of the counting stages 5, 7 and 8 (FIG. 1). For each pulse, the three counting stages switch forward by one unit. For each tenth pulse the output stage $e$ furnishes a pulse to the input $a$ of the counting stage 4 or 6 so that the counting stages 4 and 6, upon each tenth pulse of the appertaining measuring transmitter, switch forward one unit. After completing the measuring operation the measured result is electronically stored in the counting stages 4 to 8.

Closing of contact 15 places a positive potential upon all terminals $d$ of the counting stages 4 to 8. The positive potential passes through the outputs $c$ to the pawl magnets 9 to 13 on the one hand and through the "OR" gate 16 to the keyer 14 on the other hand. The keyer 14 may consist, for example, of a bistable multivibrator which, when a positive potential is applied, switches at a low frequency, for example of 5 to 10 cycles per second. The switching pulses from the keyer 14 pass to the stepping magnets 17, 18 as well as to the inputs $b$ of the counting stages 4 to 8. The counting stages 4 to 8 are thus switched forward one unit by each pulse. When a counting stage arrives at its position zero, the potential at the output $c$ is zero. The keyer 14 operates until the potential of all five inputs to the "OR" gate 16 are at zero voltage and consequently until all counter stages 4 to 8 are in the position zero.

The potential difference at the pawl magnets 9 to 13 causes them to attract their respective armatures which subsequently drop back to their position of rest when the potential at the outlet $c$ of the counting stages 4 to 8 is zeroed. The counting of the data stored in the counting stages 4 to 8 from the measured value down to the zero position of each counter results in a value which is complementary to the amount of the measurement. In order to correctly transfer the amount into the value storages or memories, the latter must be provided with reverse sequences of numbers.

FIG. 2 shows a counting device that can be operated by means of a system as shown in FIG. 1. Provided as value storages or memories for each counting stage are respective readout or number drums 21 to 25. Accordingly, the number drum 21 shows the hundreds values of the amount, the number drums 22 and 23 show the tens values, and the number drums 24 and 25 show the unit values.

With each pulse from the keyer 14 the stepping magnets 17 and 18 attract their respective armatures 26 and 27. Secured to each armature is a control rod 28 which moves together with the armatures 26 and 27. The armatures are rotatably mounted on a pivot shaft 29 (FIGS. 2, 3, 4, 5). The number drums 21 to 25 have the same design relative to the components for entering the counts and for resetting the drums. It will therefore be sufficient to describe one of the drum assemblies more in detail.

The number drum 21 is rotatably mounted on a shaft 20. A ratchet wheel 40 and a heart-shaped resetting cam 45 (FIGS. 3, 4, 5, 7) are firmly joined with the number drum 21. The ratchet 40 is acted upon by a stepping pawl 30 mounted on the control rod 28. A spring 32 serves as an elastic medium for connecting the pawl 30 which the magnet armature 33, likewise rotatable on the shaft 29. A detent 38 likewise acts upon the ratchet 40 for preventing an uncontrollable rotation of the number drum 21. The detent 38 is rotatably mounted on a shaft 39. A spring 46 having one end hooked to another shaft 42, secures an elastic engagement of the detent 38 with the ratchet 40. The resetting cam 45 and an appertaining resetting lever 43 are provided for returning the number drum 21 to its zero position. The resetting lever 43 is keyed to the shaft 44 and can be placed into the desired position by turning the shaft 44. For resetting the number drum, the detent 38 must be lifted off the ratchet 40. This is done by a pin 41 which is secured to the resetting lever 43.

The digit-transfer or tens-transfer means are of conventional design and comprise a spur gear 71, a pinion 72 and a locking disc 73 (FIG. 2).

Figure 4:
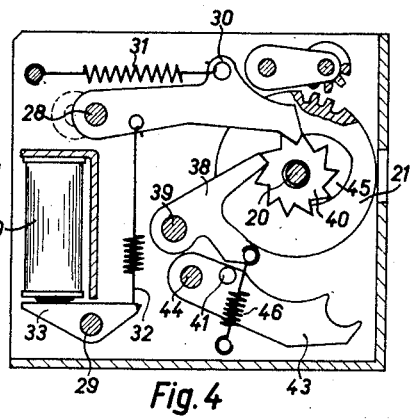
FIG. 4 shows the same cross-sectional view as FIG. 3 but with a different position of the switching pawl.

The counting operation for entering stored values from the memory units 4 to 8 into the number drums will be described presently with reference to FIGS. 3 to 5. FIG. 3 shows the pawl-magnet armature 33 in attracted position and the control rod 28 with the stepping-magnet armatures 26 and 27 in position of rest. This puts a load upon the switching spring 32 and places the pawl 30 in engagement with the ratchet 40 in opposition to the force exerted by the return spring 31. The next pulse issuing from the keyer causes the stepping armatures 26 and 27 to be attracted, and the control rod 28 presses the pawl 30 to the position shown in FIG. 4. The spring 32 secures a continuous engagement of pawl 30 with ratchet 40 when the pawl-magnet armature 33 is attracted. During the inter-pulse gaps of the keyer 14 the armatures 26 and 27 are pulled to the position of rest by the return spring 31, and the pawl 30 snaps into the next tooth gap of the ratchet wheel 40.

As soon as the counting stage 4 (FIG. 1) has reached its zero position, the pawl magnet 9 is deenergized, and the armature 33 turns about the pivot shaft 29 to its position of rest (FIG. 5). This unloads the switching spring 32 which no longer exerts force upon the pawl 30. The pawl 30 therefore assumes the position shown in FIG. 5. Further movements of the control rod 28 do not cause rotation of the number drum 21.

The resetting of the number drums 21 to 25 is effected by turning the shaft 44. A slight lifting of the resetting lever 43 causes its pin 41 to remove the detent 38 from the ratchet 40 (FIG. 5). During further turning motion of the shaft 44, the resetting lever 43 enters into engagement with the heart cam 45 and imposes a resetting force upon this cam.

Clutches are built into the mechanism between the number drums 22 and 23 and also between drums 24 and 25 which store the tens values and the unit values respectively. An example for a suitable clutch is shown in FIG. 6 and described presently. Rotatably mounted on the number wheel 23 or 25 is a reference lever 61 by means of a screw bolt 63. The free end of the reference lever 61 carries a rotatable roller 62. The lever 61 is biased by a spring 66 which pulls the rotatable roller 62 toward the center of the shaft 20. Located in the same plane as the roller 62 is a followup heart cam 64 which is rotatably mounted on the shaft 20 by means of a tubular shaft 65 and is rigidly connected with the preceding number drum 22 or 24. The operation of such a device for resetting the number drums is known, except that in this case the number drum is not turned to a predetermined setting (for example zero) but the two interconnected number drums are caused to adjust themselves to the same number.

FIG. 7 illustrates a numerical example according to which the two number drums 21 and 22 indicate the partial result of the first measuring-value transmitter 1 as the value 49. The drums 23 and 24 indicate the partial result of the transmitter 2 as the value 98. The drum 25 indicates the partial result of transmitter 3 as being the value 1. Due to the difference in setting between the two number drums 24 and 25, the intermediate coupling is placed under tension.

The correction method proceeds in the following manner. The transfer pinions 72 are swung into meshing engagement with the spur gears 71 by means of the shaft 76 acting through the levers 75. The detents 38 of number drums 21 and 22 are disengaged by slight lifting of the resetting levers 43. The coupling between the number drums 22 and 23 is not tensioned because these two drums indicate the same number. The detents 38 of number drums 23 and 24 are now likewise disengaged, while the detents 38 of drums 21 and 22 remain in disengaged position. The force of spring 66 acts upon the reference lever 61 and turns the follow-up cam 64 of the coupling between drums 24 and 25 until the roller 62 has reached the arresting position 67. Consequently, the number drum 24 turns from number 8 through 9 to the number 1. The transfer when passing from 9 to 0 is transmitted by means of the transfer pinion 72 to the number drum 23 which is thus turned from 9 to 0. The coupling between the number drums 22 and 23 acts rigidly whereby the drum 22 is likewise turned to 0. The transition from 9 to 0 of number drum 22 is likewise transferred by the pinion 72 to the drum 21 which thereby turns from 4 to 5. The corrected result is now indicated as 501.

The above-described stepwise correction can just as well be performed as a single operation by disengaging the detents 38 of the number drums 21 to 24 simultaneously. Only the number drum 25 must not be released during this operation. In FIG. 7, to facilitate understanding the operation, all number drums are shown to have the same design and to be provided with the same sequence of numbers. Obviously, of two number drums which indicate the same digital positions, only one need be provided with indicating numbers. The other drum, for example the drum 22 or the drum 24, can be omitted and the amount can be directly counted into the locking disc 73.

There is the possibility that during the measuring operation a displacement of the electronic zero point in one of the sensors or measuring-value transmitters 1, 2, 3 may occur due to external influences and that this may lead to falsifying the corresponding partial result. By means of a device according to the invention, any partial result can be determined another time and can be counted into the corresponding, previously cleared or reset value-storage or memory unit. If the latter measurement has a different resulting amount, then any necessary correction is transmitted by means of the coupling to the other digit positions of the result.

A system according to the invention as shown in FIG. 1 can be simplified by employing a single group of data-entering devices, for example the transmitter 1 and the counting stages 4 and 5, for all digit positions of the entire amount to be converted from analog to digital representation. This can be done by switching the outputs c of the one data-entering group sequentially to the respective value-storage or memory devices, such as the number drums, of the converting apparatus.

In the embodiment of an analog-to-digital converter according to the invention illustrated in FIGS. 8 to 12, the correction is effected by electrical means. The block diagram of FIG. 8 corresponds to that of FIG. 1 with respect to the transmitter units and pulse counter units 1 to 8. The measuring-value transmitters or sensors 1, 2, 3 measure the quantity to be converted with the aid of the step-voltage comparing or zero-compensating method. The transmitter 1 counts the measured quantity in steps of ten which are memorized in the counter stages 4 and 5. The value transmitters 2 and 3 count the measuring magnitude by means of unit steps. The pulses of the transmitter 2 are memorized in counter stages 6 and 7, and the pulses of transmitter 3 are memorized in counter stage 8. The counter stages 4, 5 and 6, 7 are provided with digit-transfer or tens-transfer means. Provided between the counting stages 5 and 6 and between the stages 7 and 8 are comparator networks 81 and 83 respectively which act by means of respective polarized relays 82 and 84 upon the counter stages 5 and 7 respectively whereby these counter stages can count either forward or in reverse.

A value difference between the counting stages thus intercoupled also effects the corresponding keyer 85 or 86 to be switched on which then issues pulses to the input a of the counter stage 5 or 7 until the value difference has become zero. A switch 90 connects the indicating members 87, 88 and 89 with the respective counting stages 4, 6 and 8.

The simplified diagram of FIG. 9 shows the circuitry of a result storage or memory with two value storages or memories, for example the counting stages 4 and 5. The counting tube V4 corresponds to counting stage 4. The counting tube V5 corresponds to counting stage 5. The equipment is such that the counting stages 4 to 8 are designed as value storages or memories which memorize the counted measuring-value pulses and simultaneously serve as indicating means. The details incorporated in this circuit diagram are described in the German-language periodical Elektronik, 1956, No. 11, pages 301 to 306. The counting tubes must possess symmetrical cathodes and must be designed as double-impulse tubes such as, for example, the tubes available in the trade under the name Dekatron. The moving direction of the discharge depends upon whether the pulses first reach the circuit branch H1 and thereafter the branch H2 (forward) or whether they first reach H2 and thereafter H1 (reverse).

According to FIG. 9 two driver stages 91 and 92 act upon the counting tube V5. The driver stages are controlled by a relay 95 in such a manner that the driver stage 91 is switched on in the "OFF" position of the relay, and the driver stage 92 is switched on in the "ON" position of the relay. The outputs of the driver stages 91 and 92 are connected crosswise with the auxiliary cathodes of the counting tube V5 so that pulses of driver stage 91 release forward steps and pulses of driver stage 92 release reverse steps. The counting cathodes K9 and K0, representing the corresponding numerals 9 and zero, are likewise connected to driver stages 93 and 94 with the auxiliary cathodes of the counting tube V4. As a result, the tens value (counting tube V4) jumps upward one unit during addition when the unit value (counting tube V5) changes from 9 to zero. However, when the relay 95 has responded, the tens value jumps one step downward when the unit value changes from zero to 9.

FIG. 10 illustrates an example of a driver stage which may be utilized as any one of the driver stages 91 to 94. The measuring-value pulses reach the input lead a where they are differentiated by means of a capacitor C101 and a resistor R101. Resistors R102 and R104 place a given potential upon the ignition electrode of the tube V101 whereby the tube is ignited by means of a differentiated pulse. The current pulse thus caused to a flow in the anode circuit passes on the one hand through a difference forming member consisting of a capacitor C102 and a resistor R108, to one auxiliary cathode of the counting tube V5. On the other hand, the pulse passes through the delaying and difference-forming member, formed of resistors R105, R109 and a capacitor C103, to the other auxiliary cathode. Consequently, the counting direction is determined by the choice in the sequence of the auxiliary cathode. With a closed contact K95 of relay 95 the inactive-state potential at the ignition electrode of tube V101 is reduced to such an extent that a differentiated pulse cannot cause ionization.

FIG. 11 shows circuitry applicable in the comparator network 81 or 83. The input terminals T1 to T0 are energized from the cathodes K1 to K0 of the counting stage 5 through reversing stages. The input terminals denoted in FIG. 11 by K1 to K0 are energized from the cathodes of the counting stage 6. The following equation relates to the relation of the potential between the input terminals:

$$T1 \ldots T0 = \overline{K1} \ldots \overline{K0}$$

The reversing stage required for each cathode output is exemplified in FIG. 12 and is generally known.

The ten relay windings W110 to W119 are wound upon a common core and constitute the windings of a polarized relay 82. Connected in series to each winding is a pair of mutually opposed diodes G120 to G139. Each ten circuits form a closed ring whose connections lead on the one hand through respective diodes G110 to G119 to the input terminals T1 to T0 and, on the other hand, through respective diodes G140 to K149 and respective series-connected resistors R110 to R119 to the input terminals K1 to K0.

The operation of the comparator stage will be described with reference to an arbitrary example.

Assume that the counter stage 5 is on numeral 6 and the counter stage 6 on numeral 3. Consequently, the counter stage 5 must count in reverse in order to arrive at the same numeral as the counter stage 6. The potentials of the input terminals K1 to K0, with the exception of the input terminal K3, are at ground potential, and so are the counting cathodes of the counting stage 6. The input terminal K3, however, has a potential of +15 volts. Due to the reversing stages, the potential conditions at input terminals T1 to T0 are reversed. That is, only the input terminal T6 is at ground potential, whereas the other input terminals T1 to T0 are at a potential of +15 v. Consequently, a current flows from input terminal K3 to input terminal T6 through the windings W112, W113 and W114, on the one hand, and also flows through the windings W110, W111, W119, W118, W117, W116 and W115, on the other hand. Diodes have a curved characteristic. Consequently, the series connection of the diodes with the windings has the effect that the ampere turns of the seven latter windings in totality are smaller than the ampere turns of the windings W112 to W114. As a result, the polarized relay is switched to the side necessary for the required direction of correction and the correct driver stages 91 and 93 or 92 and 94 are put in operation by the contacts K95.

The same contact of the polarized relay 82, in each active position, places a potential upon the keyer 85 of FIG. 8 so that the keyer issues pulses to the inputs a of the counting stage 5. When the numeral 3 is reached, the entire potential difference in the comparator stage 81 is placed upon the resistor R112, and the windings of the polarized relay 82 are deenergized. This also removes the operating potential of the keyer 85, and the compensating operation between the counting stages 5 and 6 is terminated. The same design applies to the comparator stage 83 between the counting stages 7 and 8, in which the same operation may occur.

To those skilled in the art it will be obvious upon a study of this disclosure that my invention is amenable to a great variety of modifications with respect to mechanical or electrical components, circuitry and arrangement, and that it can be equally applied for indicating or otherwise processing the digitally expressed quantity. The invention therefore can be given embodiments other than particularly illustrated and described herein without departing from the essential features of my invention and within the scope of the claims annexed hereto.

I claim:

1. A device for digitally measuring a quantity comprising
   a plurality of sensing means for obtaining separate partial measurements each of which embraces a plurality of the digits but less than all in the total measurement and which has an error only in a lower order digit of each partial measurement less than one-half of the number of steps in the digital order used, said numerical value of a lower order digit in each partial measurement being repeated as the first digit of another partial measurement;
   measurement memory means connected to said respective sensing means for receiving and storing the count from said sensing means;
   individual storage units in each of said memory means corresponding to the number of digit positions in the partial measurements for storing the individual digits of each partial measurement, the first storage unit of each of said memory means memorizing the same digital order of the measured magnitude as the last storage unit of another of said memory means;
   digit position transfer means connecting the storage units in each memory means to each other, said digit position transfer means comprising gear means removable coupling selected adjacent ones of said memory means and clutch means removably coupling selected adjacent others of said memory means; and
   correcting means between the last data storage unit of one memory means and the corresponding first storage unit of the other memory means for correcting any difference between the two values by shifting the last storage unit the smallest number of digital steps to the value of the corresponding digit position of the first storage unit of the other memory means.

2. A device for digitally measuring a quantity comprising
   a plurality of sensing means for obtaining separate partial measurements each of which embraces a plurality of the digits but less than all in the total measurement and which has an error only in a lower order digit of each partial measurement less than one-half of the number of steps in the digital order used, said numerical value of a lower order digit in each partial measurement being repeated as the first digit of another partial measurement;
   measurement memory means connected to said respective sensing means for receiving and storing the count from said sensing means, said memory means comprising a plurality of mechanical counting means corresponding in number to the digit position in the partial measurements;
   a plurality of individual storage units in each of said memory means corresponding to the number of digit positions in the partial measurements for storing the individual digits of each partial measurement, the first storage unit of each of said memory means memorizing the same digital order of the measured magnitude as the last storage unit of another of said memory means;
   digit position transfer means for connecting the storage units in each memory means to each other, said digit position transfer means comprising gear means removably coupling selected adjacent ones of said memory means and clutch means removably coupling selected adjacent others of said memory means, said digit position transfer means including moving means for moving said gear means into and out of coupling position and moving means for moving said clutch means into and out of coupling position;
   correcting means between the last data storage unit of one memory means and the corresponding first storage unit of the other memory means for correcting any difference between the two values by shifting the last storage unit the smallest number of digital steps to the value of the corresponding digit position of the first storage unit of the other memory means.

3. A device for digitally measuring a quantity comprising
   a plurality of sensing means for obtaining separate partial measurements each of which embraces a plurality of the digits but less than all in the total measurement and which has an error only in a lower order digit of each partial measurement less than one-half of the number of steps in the digital order used, said numerical value of a lower order digit in each partial measurement being repeated as the first digit of another partial measurement;
   measurement memory means connected to said respective sensing means for receiving and storing the count from said sensing means, said memory means comprising electronic counter tubes;
   a plurality of individual storage units in each of said memory means corresponding to the number of digit positions in the partial measurement, the first storage unit of each of said memory means memorizing the same digital order of the measured magnitude as the last storage unit of another of said memory means;
   digit position transfer means connecting the storage units in each memory means to each other, said digit position transfer means comprising gear means removably coupling selected adjacent ones of said memory means and clutch means removably coupling selected adjacent other of said memory means; and
   correcting means between the last data storage units of one memory means and the corresponding first storage unit of the other memory means for correcting any difference between the two values by shifting the last storage unit the smallest number of digital steps to the value of the corresponding digit position of the first storage unit of the other memory means,
   said correcting means comprising electronic comparator stages between said memory means.

4. A device as claimed in claim 2, further comprising a drum connected to each of said storage units to indicate the digits, and covering means concealing one of the twice ascertained digit positions.

5. A device as claimed in claim 2, wherein said correcting means includes a heart-shaped resetting cam and a reference lever turning said cam whereby different numerical values in twice ascertained digit positions cause relative movement between said cam and said lever.

6. A device as claimed in claim 3, wherein each of the comparator stages of said correcting means comprises a tristable polarized relay having a ring connection of mutually identical windings and a core for said windings.

7. A device as claimed in claim 6, wherein said correcting means includes a driver stage for said counter tubes and auxiliary relay means to actuate the driver stages into the correcting direction.

8. A device as claimed in claim 7, wherein said driver stages for said counter tubes are disconnectable by said auxiliary relay means during the correcting operation.

9. A device as claimed in claim 3, further comprising reversing stages connecting one of the counter tubes of said memory means to one side of the comparator stages of said correcting means and said comparator stages are connected directly at the other side to another of said counter tubes.

References Cited by the Examiner
UNITED STATES PATENTS 2,813,677  11/1957  Scarborough _____ 340—347
3,007,637  11/1961  Merrowitz _____ 340—347

MALCOLM A. MORRISON, *Primary Examiner.*